(12) United States Patent
Ortiz-Munoz et al.

(10) Patent No.: US 9,553,852 B2
(45) Date of Patent: *Jan. 24, 2017

(54) SECURE CONNECTION BETWEEN A DATA REPOSITORY AND AN INTELLIGENCE APPLICATION

(71) Applicant: BANK OF AMERICA CORPORATION, Charlotte, NC (US)

(72) Inventors: Melissa Ortiz-Munoz, Springfield, VA (US); Richard V. Wherry, Medford, MA (US); Allen J. Thompson, Norwell, MA (US); Christopher J. Fiore, Southington, CT (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/011,058

(22) Filed: Jan. 29, 2016

(65) Prior Publication Data

US 2016/0149872 A1 May 26, 2016

Related U.S. Application Data

(63) Continuation of application No. 14/157,371, filed on Jan. 16, 2014, now Pat. No. 9,262,622.

(Continued)

(51) Int. Cl.
*G06F 21/30* (2013.01)
*H04L 29/06* (2006.01)
*G06F 21/44* (2013.01)

(52) U.S. Cl.
CPC ......... *H04L 63/0428* (2013.01); *G06F 21/44* (2013.01); *H04L 63/08* (2013.01); *H04L 63/10* (2013.01); *H04L 63/102* (2013.01); *H04L 63/123* (2013.01)

(58) Field of Classification Search
CPC ....................................................... G06F 21/30
See application file for complete search history.

(56) References Cited

U.S. PATENT DOCUMENTS 5,983,274 A 11/1999 Hyder et al.
6,351,846 B1 2/2002 Collin et al.
(Continued)

*Primary Examiner* — William Powers
(74) *Attorney, Agent, or Firm* — Michael A. Springs; Moore & Van Allen PLLC; W. Kevin Ransom

(57) ABSTRACT

Embodiments of the invention are directed to systems, methods and computer program products for establishing a secure connection between a data repository and an intelligence application. In one embodiment, a method includes receiving, from a user device and using a processing device, a request from the intelligence application, the request communicated from the intelligence application through a data virtualization application and for obtaining access to the data repository; responding, using the processing device, to the request comprising preparing and sending an authentication request through the data virtualization application to the intelligence application; receiving authentication credentials from the intelligence application through the data virtualization application, the authentication credentials associated with one or more users of a plurality of users authorized to access the data repository; determining that the authentication credentials are valid; and providing device, access to the data repository in response to validating the authentication credentials.

6 Claims, 6 Drawing Sheets

Related U.S. Application Data

(60) Provisional application No. 61/912,882, filed on Dec. 6, 2013.

(56) References Cited

U.S. PATENT DOCUMENTS

| | | |
|---|---|---|
| 6,438,612 B1 | 8/2002 | Ylonen et al. |
| 6,594,709 B1 | 7/2003 | Agasaveeran et al. |
| 7,051,038 B1 * | 5/2006 | Yeh .................. G06F 17/30575 |
| | | 707/603 |
| 7,099,947 B1 | 8/2006 | Nadeau et al. |
| 7,165,174 B1 | 1/2007 | Ginter et al. |
| 7,174,342 B1 | 2/2007 | Scheurich et al. |
| 7,331,061 B1 | 2/2008 | Ramsey et al. |
| 2007/0204153 A1 * | 8/2007 | Tome .................. H04L 63/0272 |
| | | 713/164 |
| 2010/0169948 A1 * | 7/2010 | Budko .................... G06F 21/53 |
| | | 726/1 |
| 2010/0198804 A1 * | 8/2010 | Yaskin ................ G06F 21/6218 |
| | | 707/706 |

* cited by examiner

SECURE CONNECTION BETWEEN A DATA REPOSITORY AND AN INTELLIGENCE APPLICATION

CROSS-REFERENCE TO RELATED APPLICATIONS

This application is a continuation of U.S. patent application Ser. No. 14/157,371, filed Jan. 16, 2014, which in turn is a non-provisional application of the Provisional Application No. 61/912,882, filed Dec. 6, 2013; the contents of which are hereby incorporated by reference.

BACKGROUND

In some enterprises security and/or standards concerns may require discretion regarding authentication for access to data. For example, under certain security procedures or protocol (such as those that may be promulgated by a center of excellence (COE), certain types of federated data must be secured by limiting a number of authorized users, levels of access or otherwise. Because of this, some access tools, such as user reporting tools or analytical tools may not be effectively integrated or interfaced with secured data repositories.

BRIEF SUMMARY

Embodiments of the invention provide multiple intelligence application users access to a secured data repository through a data virtualization application. A secure connection between the user's intelligence application and the data repository may be established once the user enters validated user authentication credentials that are validated by a data repository JAVA database connection (JDBC) driver (DR JDBC driver). The DV JDBC driver may validate the users and then serve as a gateway for accessing the repository using administrator credentialing.

According to embodiments of the invention, an apparatus for establishing a secure connection between a data repository and an intelligence application includes a memory; a processor; and a module stored in the memory, executable by the processor, and configured to receive a request from the intelligence application, originating from a user device, the request communicated from the intelligence application through a data virtualization application and for obtaining access to the data repository; respond to the request comprising preparing and sending an authentication request through the data virtualization application to the intelligence application; receive authentication credentials from the intelligence application through the data virtualization application, the authentication credentials associated with one or more users of a plurality of users authorized to access the data repository; and determine that the authentication credentials are valid.

In some embodiments, the module is further configured to provide access to the data repository in response to validating the authentication credentials. In some such embodiments, the module is further configured to present, to the data repository, a data repository administrator authentication credential in response to determining that the user authentication credentials are valid. In some such embodiments, the module is further configured to receive validation from the data repository that the data repository administrator authentication credential is valid, thereby granting access to the data repository. In some such embodiments, the module is further configured to, in response to receiving validation from the data repository that the data repository administrator authentication credential is valid, establish a secure connection between the data repository and the intelligence application and through the data virtualization application.

In some embodiments, the intelligence application comprises Spotfire™. In some embodiments, the data virtualization application comprises Composite™. In some embodiments, the data repository comprises SAS SPDS™. In some embodiments, the module comprises an SAS SPDS™ JDBC Driver.

According to embodiments of the invention, a computer program product for establishing a secure connection between a data repository and an intelligence application includes a non-transitory computer-readable medium comprising a set of codes for causing a computer to receive a request from the intelligence application, originating from a user device, the request communicated from the intelligence application through a data virtualization application and for obtaining access to the data repository; respond to the request comprising preparing and sending an authentication request through the data virtualization application to the intelligence application; receive authentication credentials from the intelligence application through the data virtualization application, the authentication credentials associated with one or more users of a plurality of users authorized to access the data repository; and determine that the authentication credentials are valid.

In some embodiments, the set of codes further causes a computer to provide access to the data repository in response to validating the authentication credentials. In some such embodiments, the set of codes further causes a computer to present, to the data repository, a data repository administrator authentication credential in response to determining that the user authentication credentials are valid. In some such embodiments, the set of codes further causes a computer to receive validation from the data repository that the data repository administrator authentication credential is valid, thereby granting access to the data repository. In some such embodiments, the set of codes further causes a computer to, in response to receiving validation from the data repository that the data repository administrator authentication credential is valid, establish a secure connection between the data repository and the intelligence application and through the data virtualization application.

In some embodiments, the intelligence application comprises Spotfire™. In some embodiments, the data virtualization application comprises Composite™. In some embodiments, the data repository comprises SAS SPDS™. In some embodiments, the module comprises an SAS SPDS™ JDBC Driver.

According to embodiments of the invention, a method for establishing a secure connection between a data repository and an intelligence application. The method comprising receiving, from a user device and using a processing device, a request from the intelligence application, the request communicated from the intelligence application through a data virtualization application and for obtaining access to the data repository; responding, using the processing device, to the request comprising preparing and sending an authentication request through the data virtualization application to the intelligence application; receiving, using the processing device, authentication credentials from the intelligence application through the data virtualization application, the authentication credentials associated with one or more users of a plurality of users authorized to access the data repository; and determining, using the processing device, that the authentication credentials are valid.

In some embodiments, the method also includes providing, using the processing device, access to the data repository in response to validating the authentication credentials.

BRIEF DESCRIPTION OF THE DRAWINGS

Figure 1A:
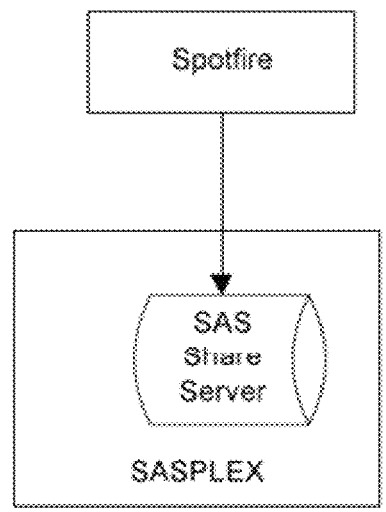
Figure 1B:
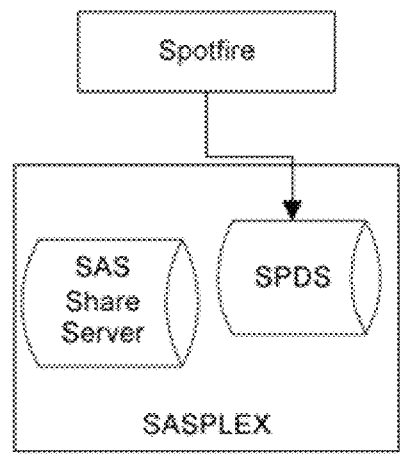
Figure 2A:
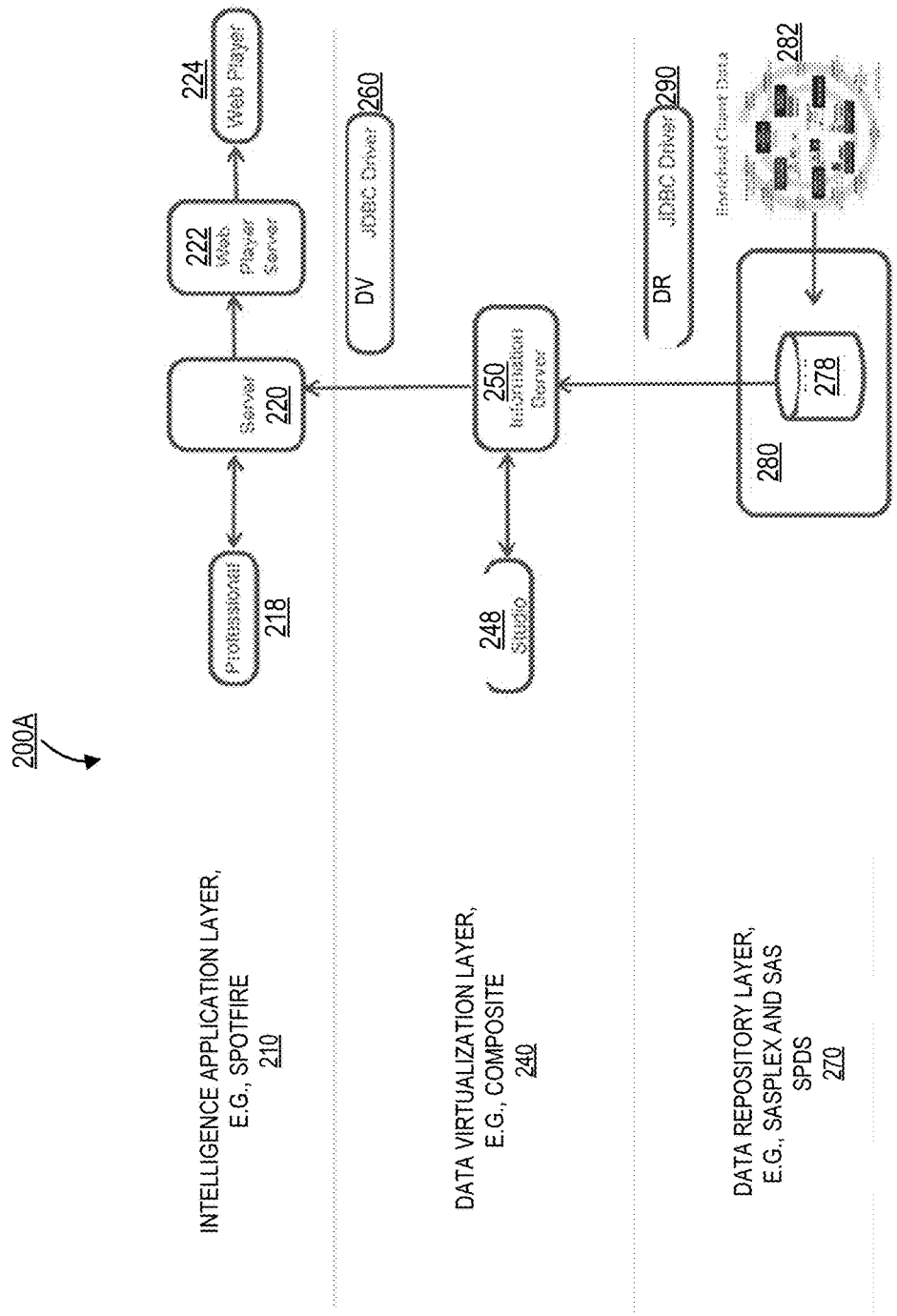
Figure 2B:
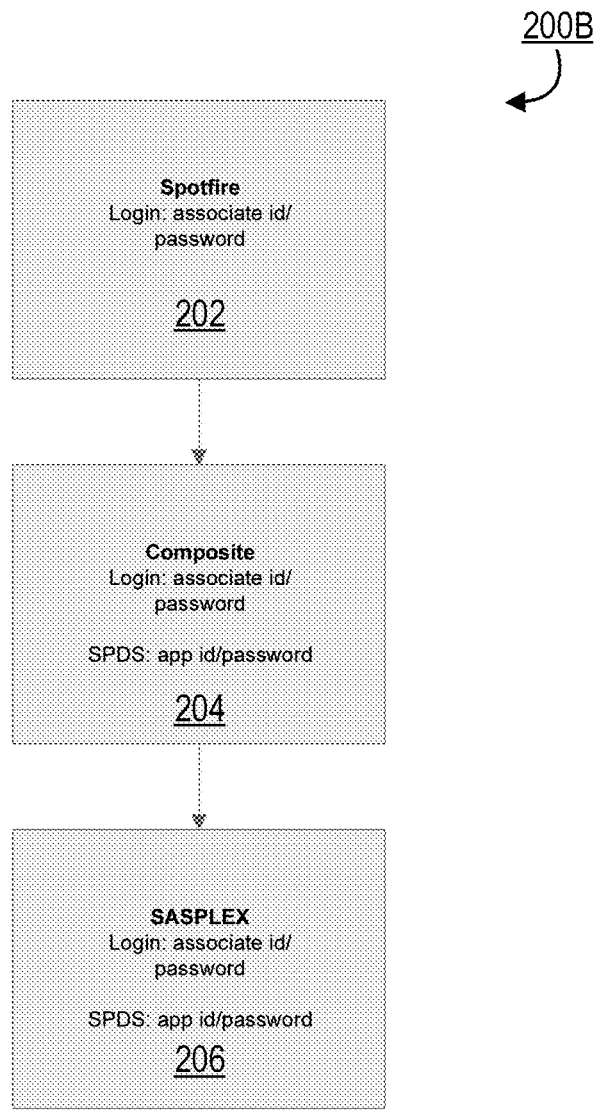
Figure 3:
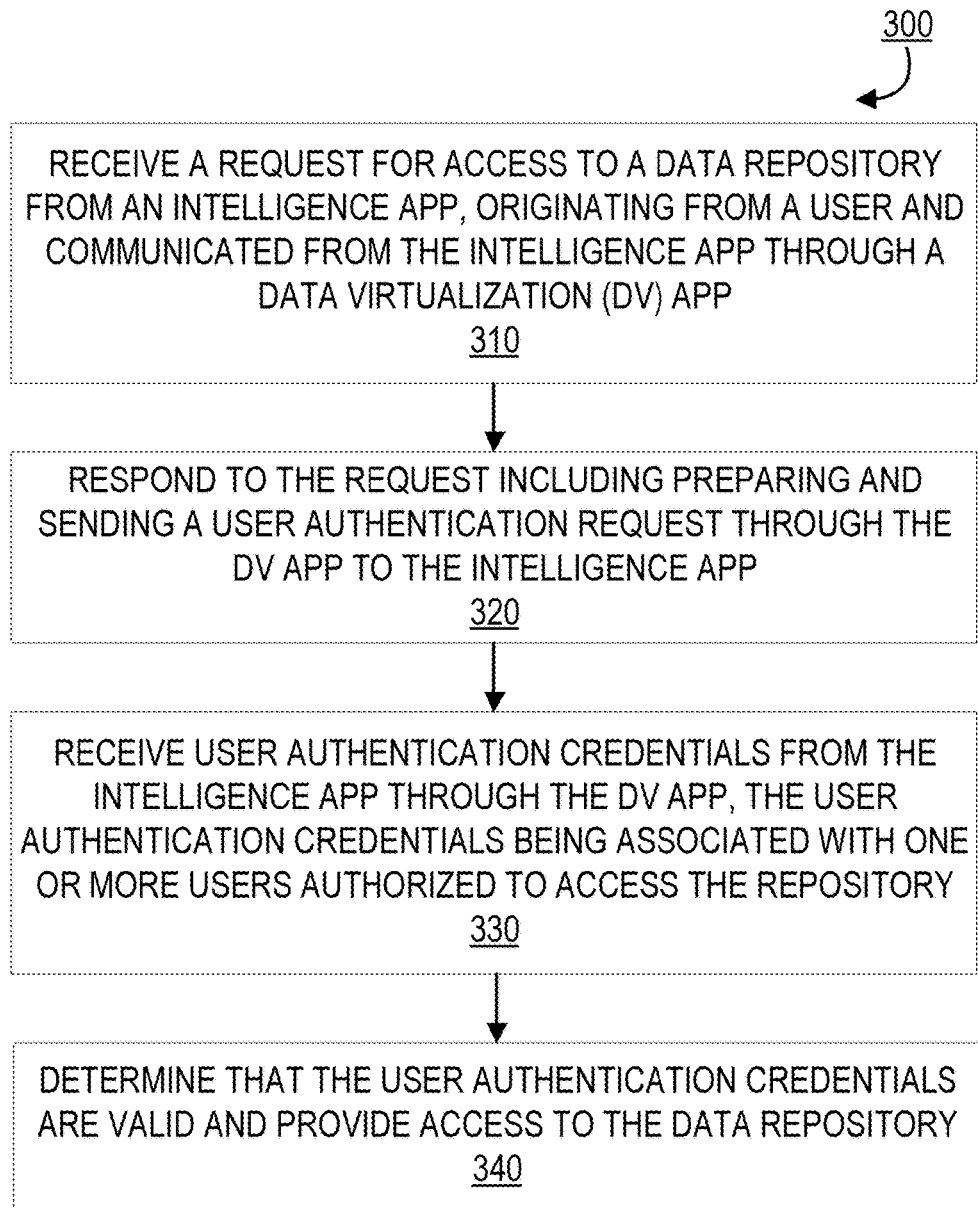
Figure 4:
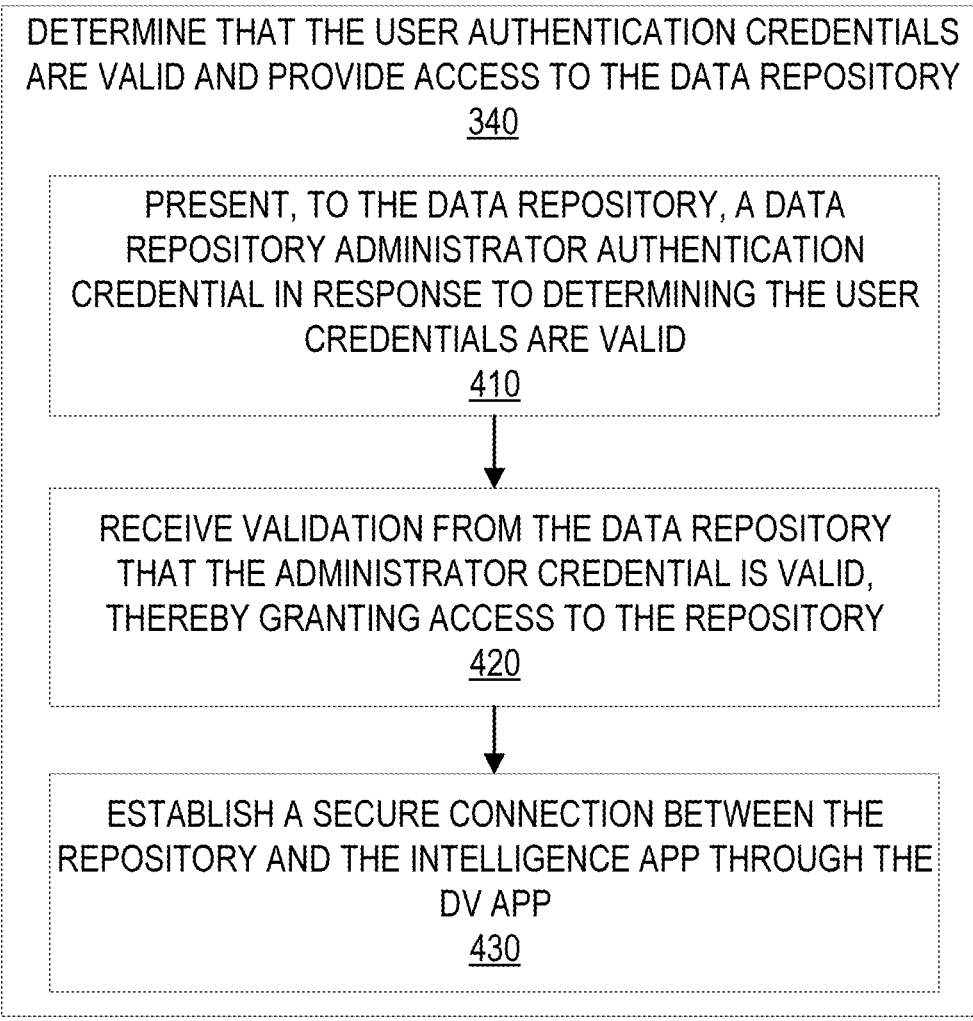
Figure 5:
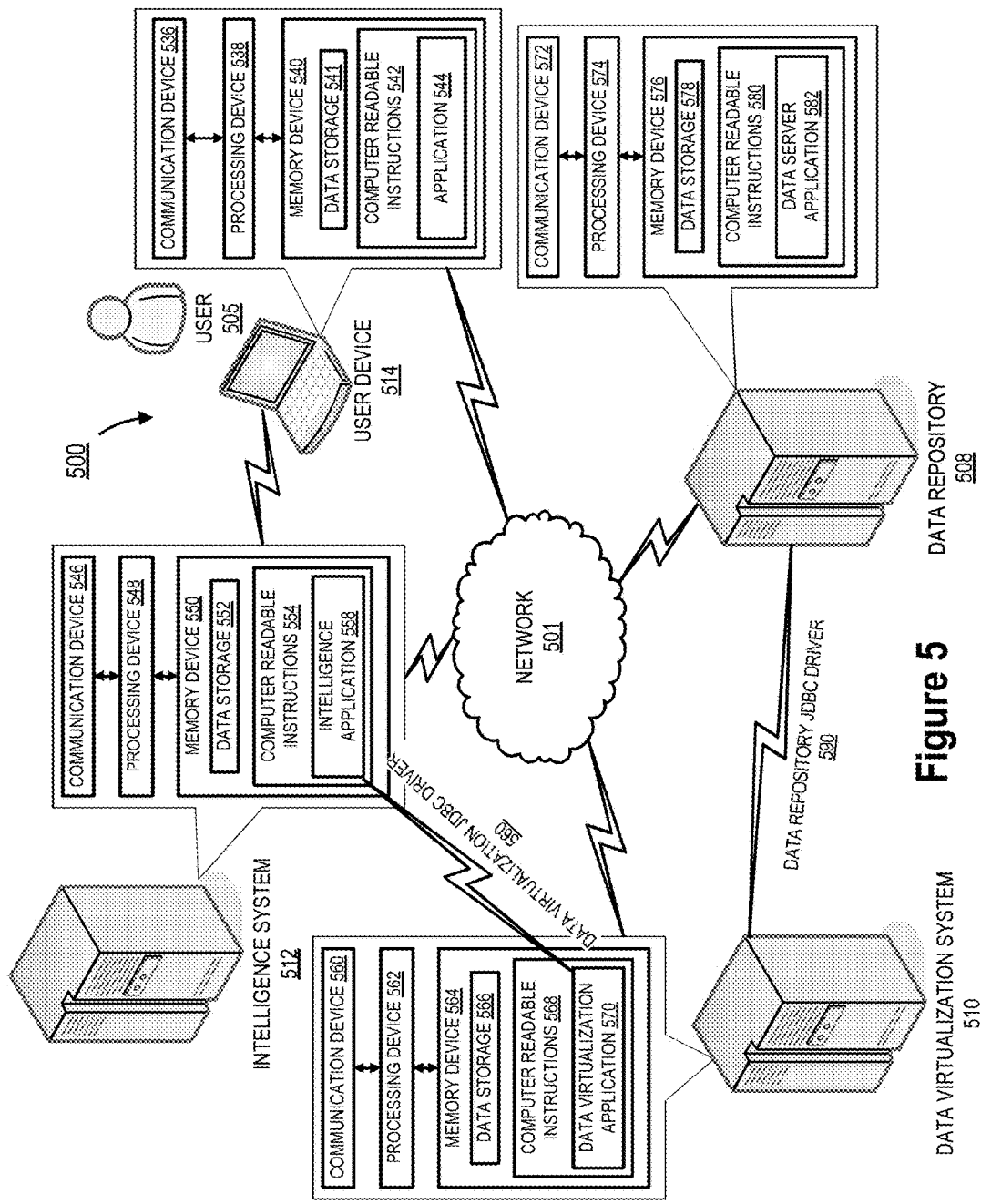

Having thus described embodiments of the invention in general terms, reference will now be made to the accompanying drawings, where:

FIGS. 1A and 1B are diagrams of connections between an intelligence application layer such as Spotfire and a data repository layer such as SASPLEX;

FIG. 2A illustrates an environment wherein systems operate according to embodiments of the invention;

FIG. 2B is a combined flowchart and diagram illustrates a method 200B for authentication of a Spotfire user for accessing SAS SPDS data through Composite;

FIG. 3 is a flowchart illustrating a method 300 for establishing a secure connection between a data repository and an intelligence application according to embodiments of the invention;

FIG. 4 is a flowchart illustrating various sub-steps of step 340 according to embodiments of the invention; and FIG. 5 illustrates an environment wherein systems operate according to embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for establishing a secure connection between a data repository and an intelligence application. In one embodiment, a method includes receiving, from a user device and using a processing device, a request from the intelligence application, the request communicated from the intelligence application through a data virtualization application and for obtaining access to the data repository; responding, using the processing device, to the request comprising preparing and sending an authentication request through the data virtualization application to the intelligence application; receiving, using the processing device, authentication credentials from the intelligence application through the data virtualization application, the authentication credentials associated with one or more users of a plurality of users authorized to access the data repository; determining, using the processing device, that the authentication credentials are valid; and providing, using the processing device, access to the data repository in response to validating the authentication credentials.

Referring to FIGS. 1A and 1B, two connections between an intelligence application layer such as Spotfire and a data repository layer such as SASPLEX are shown. FIG. 1A illustrates Spotfire connected directly to the SAS Share Server on the SASPLEX. Such a connection may be unacceptable to an organization because, for example, a line of business of the organization does not secure the accessible data. In other words, anyone who uses the SAS Share Server can access any group's data that is stored on the server because the SAS Share Server allows access through only one user ID. Hence, any group or user who has access to the SAS Share Server using the connection shown in FIG. 1A knows the only user ID for the server and, therefore, has access to all data stored there.

FIG. 1B illustrates Spotfire connected directly to the SPDS on the SASPLEX. Such a connection may also be unacceptable to an organization because, for example, Spotfire only has support for Base SAS data but does not have support for SPDS data.

In order to overcome such unacceptable connections, the present invention uses a configuration such as that shown in FIG. 2. As shown in FIG. 2, an environment 200A is illustrated wherein embodiments of the invention operate. As shown an intelligence application layer 210 (e.g., Spotfire) may provide various functions such as easy data exploration, rapid insights and "in memory" analytics. A user, such as an entity associate may access a program, such as Spotfire Professional 118, that communicates with an intelligence application server 220, which may also be in communication with a web player server 222 and a web player 224.

This intelligence application layer 210 communicates with a data virtualization layer 240 by way of a data virtualization JDBC driver 260. The data virtualization layer 240 may enable functions such as connecting securely, federating and/or modeling data and/or publishing data. In the embodiment shown, the data virtualization layer 240 may include a DV information server 250 that is connected with a DV studio 248.

The data virtualization layer 240 (e.g., Composite) communicates with a data repository layer 270 by way of a data repository (DR) JDBC driver 290. The DR JDBC driver performs many or all of the various steps discussed here in order to establish a secure connection between the data repository and the intelligence application. The data repository layer 270 (e.g., SASPLEX) may include various functions or have certain attributes such as required security, high speed, scalability and the like. As shown, the data repository may include a database 278 or datastore such as a SAS SPDS that is part of a larger cell of databases 280 such as a SASPLEX. Enriched client data 282 may be stored and/or referenced in the database 278, which in most embodiments of the invention provides an approved provisioning point for such data.

The configuration shown in FIG. 2A leverages a separate logon for the data repository layer 270 such as the SPDS. In such embodiments, on SPDS a read/write application ID and password is used. The SPDS provides DBMS security for the stored data. The DR JDBC Driver 290 (e.g., SAS SPDS JDBC Driver) enables a connection between SPDS and Composite. The methods of FIGS. 3 and 4 are illustrated from the perspective of this Driver 290. The data virtualization layer 240 (e.g., Composite) uses a read only application ID and password to access the SPDS data. The password is encrypted as is standard with JDBC connections. In order to connect with the intelligence application layer (e.g. Spotfire), Composite uses another JDBC connection. Users of Spotfire utilize a personal ID and password and are able to create dashboards for business partners using the data accessed from SAS SPDS.

Referring now to FIG. 2B, a combined flowchart and diagram illustrates a method 200B for authentication of a Spotfire user for accessing SAS SPDS data through Composite. The first step, represented by block 202 is for a user to login to Spotfire using the user (i.e., associate) ID and password. Then, as represented by block 204, Composite connects with the SASPLEX, represented by block 206, using an SPDS application ID and password.

Referring now to FIG. 3, a method 300 for establishing a secure connection between a data repository and an intelligence application is shown. Method 300 is illustrated from the perspective of the DR JDBC Driver 290. The first step, represented by block 310, is to receive a request for access to a data repository from an intelligence application. The request is received by the DR JDBC driver 290 and typically originates from a user and/or user device such as user device 514. The request is communicated from the intelligence application through a data virtualization (DV) application.

The next step, represented by block 320, is to respond to the request. Responding may include preparing and sending a user authentication request through the DV application to the intelligence application, which communicates the request for user authentication to the user, such as by way of the user device.

The next step, represented by block 330, is to receive the user authentication credentials from the intelligence application and through the DV application. The user authentication credentials are, in various embodiments, associated with one or more users who are authorized or pre-authorized to access the data repository.

The final step, represented by block 340, is to determine that the user authentication credentials are valid. The user authentication credentials may be validated by accessing a database that includes a listing of preauthorized user authentication credentials, and if the credentials entered by the user requesting access to the repository are present in the database listing as entered by the user, then the DR JDBC driver may determine that the user requesting access is an authorized user. Once it is determined the user authentication credentials are valid, access may be provided to the data repository to the requesting entity, such as the user.

Referring now to FIG. 4, a flowchart illustrates potential sub-steps of step 340, originally presented in FIG. 3 and discussed above. As discussed, step 340 is determining that the user authentication credentials are valid and providing access to the data repository. In order to do this, in some embodiments, the DR JDBC driver presents, to the data repository, a data repository administrator authentication credential, as represented by block 410. This credential may be stored co-locally with the driver and may be accessed quickly as it may be used often.

The next sub-step, represented by block 420, is to receive validation from the data repository that the administrator credential is valid. This indicates to the DR JDBC driver that the requesting user has authorization to access the data repository.

The final sub-step, represented by block 430, is to establish a secure connection between the repository and the intelligence application through the DV application. Such a communication tunnel may allow the user easy prolonged access to the data repository, thereby allowing the user to perform complex queries and analyses without requiring multiple authentications of the user for different types or variations of data.

Referring now to FIG. 5, a network environment 500 is illustrated in accordance with one embodiment of the present invention. As illustrated in FIG. 5, the intelligence system 512 is operatively coupled, via a network 501 to the user's 505 user device 514. In this configuration, the intelligence system 512 may send information to and receive information from the data virtualization system 510. The intelligence system 512 may be or include one or more systems, computers, databases or the like and may be or include a Spotfire system. FIG. 5 illustrates only one example of an embodiment of the environment 500, and accordingly, it should be appreciated that in other embodiments one or more of the systems, devices, or servers illustrated may be combined into a single system, device, or server, or be made up of multiple systems, devices, servers, or layers.

The network 501 may be a global area network (GAN), such as the Internet, a wide area network (WAN), a local area network (LAN), a telecommunication network or any other type of network or combination of networks. The network 501 may provide for wireline, wireless, or a combination wireline and wireless communication between devices on the network 501.

As illustrated in FIG. 5, the intelligence system 512 generally comprises a communication device 546, a processing device 548, and a memory device 550. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 548 is operatively coupled to the communication device 546 and the memory device 550. The processing device 548 uses the communication device 546 to communicate with the network 501 and other devices on the network 501. As such, the communication device 546 generally comprises a modem, server, or other device for communicating with other devices on the network 501.

As further illustrated in FIG. 5, the intelligence system 512 comprises computer-readable instructions 554 stored in the memory device 550, which in one embodiment includes the computer-readable instructions 554 of an application 558. In some embodiments, the memory device 550 includes data storage 552 for storing data related to and/or used by the application 558.

In some embodiments, the application 558 may communicate with the user device 514 and the data virtualization system 510 using a data virtualization JDBC driver 560. The data virtualization system 510 may communicate with the data repository 508 using a data repository JDBC Driver 590. The user device 514, the data virtualization system 510 and/or the data repository 508 may have similar components as the intelligence system 512 discussed above. For example, each may have one or more processing devices, one or more communication devices, and one or more memory devices having computer readable instructions running various applications Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A computer program product for establishing a secure connection between a data repository and an intelligence application for exchanging authentication credentials and secured data, whereby data repository authentication credentials are protected from compromise due to user groups potentially accessing the data repository over insecure channels, the computer program product comprising:

a non-transitory computer-readable medium comprising a data repository JAVA database connection driver comprising a set of codes for causing a computer to:
  interface between a data virtualization layer and a data repository layer comprising a data repository, wherein the data repository JAVA database connection driver is in operative communication with an intelligence application layer comprising an intelligence application through the data virtualization layer;
  receive a request from the intelligence application, originating from a user device, the request communicated from the intelligence application through a data virtualization application and for obtaining access to the data repository, wherein the data repository is configured for access by multiple user groups each using the same repository authentication credential;
  respond to the request comprising preparing and sending an authentication request through the data virtualization application to the intelligence application;
  receive authentication credentials from the intelligence application through the data virtualization application, the authentication credentials associated with one or more users of a plurality of users authorized to access the data repository;
  determine that the authentication credentials are valid; and
  in response to determining the user authentication credentials are valid, establish a secure communication channel between the intelligence application layer and the data repository layer through the data virtualization layer in order to provide the repository authentication credential to the data repository layer for authentication and access to the data repository.

2. The computer program product of claim 1, wherein the set of codes further causes a computer to:
  provide access to the data repository in response to validating the authentication credentials.

3. The computer program product of claim 2, wherein providing access to the data repository comprises:
  present, from the data virtualization application to the data repository, a data repository administrator authentication credential in response to determining that the user authentication credentials are valid; and
  receive, by the data virtualization application, validation from the data repository that the data repository administrator authentication credential is valid, thereby granting access to the data repository.

4. The computer program product of claim 3, wherein the set of codes further causes a computer to:
  in response to receiving validation from the data repository that the data repository administrator authentication credential is valid, establish a secure connection between the data repository and the intelligence application and through the data virtualization application.

5. A method for establishing a secure connection between a data repository and an intelligence application for exchanging authentication credentials and secured data, whereby data repository authentication credentials are protected from compromise due to user groups potentially accessing the data repository over insecure channels, the method comprising:
  establishing an interface, using a processing device running a data repository JAVA database connection driver, between a data virtualization layer and a data repository layer comprising a data repository, wherein the data repository JAVA database connection driver is in operative communication with an intelligence application layer comprising an intelligence application through the data virtualization layer;
  receiving, from a user device and using the processing device running the data repository JAVA database connection driver, a request from the intelligence application, the request communicated from the intelligence application through a data virtualization application and for obtaining access to the data repository, wherein the data repository is configured for access by multiple user groups each using the same repository authentication credential;
  responding, using the processing device running the data repository JAVA database connection driver, to the request comprising preparing and sending an authentication request through the data virtualization application to the intelligence application;
  receiving, using the processing device, authentication credentials from the intelligence application through the data virtualization application, the authentication credentials associated with one or more users of a plurality of users authorized to access the data repository;
  determining, using the processing device running the data repository JAVA database connection driver, that the authentication credentials are valid; and
  in response to determining the user authentication credentials are valid, establishing a secure communication channel, using the processing device running the data repository JAVA database connection driver, the channel established between the intelligence application layer and the data repository layer through the data virtualization layer in order to provide the repository authentication credential to the data repository layer for authentication and access to the data repository.

6. The method of claim 5, further comprising:
  providing, using the processing device, access to the data repository in response to validating the authentication credentials.

* * * * *